United States Patent

[11] 3,580,286

| [72] | Inventor | Sidney D. Bash<br>Indianapolis, Ind. |
|---|---|---|
| [21] | Appl. No. | 813,689 |
| [22] | Filed | Apr. 4, 1969 |
| [45] | Patented | May 25, 1971 |
| [73] | Assignee | Stewart-Warner Corporation<br>Chicago, Ill. |

[54] SPOOL VALVE
5 Claims, 3 Drawing Figs.

[52] U.S. Cl. .................................................... 137/625.68,
251/368
[51] Int. Cl. ....................................................... F16k 11/07
[50] Field of Search ........................................... 137/625.68,
625.69; 251/368

[56] References Cited
UNITED STATES PATENTS

| 2,631,571 | 3/1933 | Parker .......................... | 137/625.68 |
| 2,675,024 | 4/1954 | Clark ............................ | 137/625.68 |
| 2,910,081 | 10/1959 | Karbowniczek ............. | 137/625.68 |
| 2,964,023 | 12/1960 | Meulendyk .................. | 137/625.68X |

*Primary Examiner*—Henry T. Klinksiek
*Attorneys*—Augustus G. Douvas, William J. Newman and Norton Lesser ABSTRACT: A unitary sleeve member formed of a nylon-molybdenum disulfide composition is fixedly carried in concentric fashion intermediate of the valve casing and a reciprocating valve spool and in contact with the peripheral surface of the valve spool.

Patented May 25, 1971

INVENTOR
SIDNEY D. BASH

By A. G. Douvas
ATTORNEYS.

INVENTOR
SIDNEY D. BASH

By A. G. Douras
ATTORNEYS.

INVENTOR
SIDNEY D. BASH

SPOOL VALVE

BACKGROUND OF THE INVENTION

1. Field of the Invention

This invention relates to reciprocating spool valves and more particularly to such valves employed with extremely high pressure fluids with valve operation occurring at temperatures ranging from the cryogenic to 300° F.

2. Description of the Prior Art

Spool valves have long been employed for selectively directing pressurized fluid from a source to a load device or returning exhaust fluid therefrom. In many cases, the spool valve functions as a pilot valve in a fluid servosystem. Where the fluid pressure is quite low and the temperature thereof is close to ambient, simplified spool valve structures are readily employable. Normally, the valve casing comprises a single casting carrying a longitudinal bore which forms the valve fluid cavity. A unitary spool valve reciprocates therein to selectively couple longitudinally spaced fluid inlet and outlet ports connected to supply and load lines, etc. In the most simplified construction, the value spool is formed integral with the operating shaft by surface configurating the same. Obviously, some preciseness in manufacture is required since the spool valve has its outer peripheral surface in sealing contact with the bore of the valve casing.

Where fluids under high pressure are involved, it is necessary to incorporate sufficient peripheral seals between the longitudinally spaced casing ports to prevent inadvertent flow under high pressure to other than selected ports. Further, where operations occur over a large temperature range, the expansion and contraction of the valve spool, the casing and the spool-supporting shaft may cause, at one extreme temperature or the other, undue wear between the reciprocating spool and the stationary casing, loss of fluid seal, or actual binding between the parts preventing normal operation.

In an attempt to insure against loss of a fluid seal between the reciprocating valve spool and the stationary casing receiving the same, it has been necessary to manufacture the relatively moving members under close tolerances with absolute concentricity between the parts. This is less of a problem with the valve spool where it is formed as a portion of the reciprocating valve-operating shaft, since the shaft is formed of hardened metal such as stainless steel, and the shaft may be easily machined to the close tolerances necessary.

However, the valve casing itself normally comprises a metal casting which is bored and counterbored to form the fluid cavity receiving the reciprocating shaft and the valve spool. In order to provide the stationary surfaces adjacent the valve cavity which sealably contact the valve spool periphery, it is conventional to provide a relatively large counterbore within the cast metal valve casing and insert therein a stationary sleeve assembly which in itself is manufactured to close tolerances. Not only is concentricity between the sleeve assembly and the reciprocating valve spool difficult to obtain under such circumstances but where the fluids carried by the valve are at relatively high pressures with extreme variation in temperature, there is the additional problem of maintaining concentricity subsequent to that initially achieved during manufacture and assembly. It is necessary to further ensure relative ease in spool movement between extreme positions under varying ambient temperature conditions. The known sleeve inserts have not been capable of assuring valve operation under these varying conditions.

SUMMARY OF THE INVENTION

This invention is directed to an improved spool valve for high pressure use and allowing operation over an extremely large temperature range from well below zero to several hundred degrees Fahrenheit. A valve casing carries a longitudinally extending internal fluid cavity and employs a plurality of longitudinally spaced fluid ports which extend into the cavity. An operating shaft is sealably carried by the casing and reciprocates longitudinally therein and has a surface portion configured to form a valve spool. The improvement comprises a sleeve assembly which is fixedly positioned within the casing and concentrically located between the reciprocating shaft spool portion and the outer casing. The valve spool is in peripheral contact with the sleeve assembly and at least the spool contact surfaces of the sleeve assembly are formed of a nylon-molybdenum disulfide composition.

Preferably, the sleeve assembly comprises a unitary sleeve member formed entirely of a nylon-molybdenum disulfide composition with the exception of external peripheral seals and a pair of annular contact rings carried within axial slots formed within the end faces of the unitary sleeve member.

The outer peripheral surface of the sleeve member is grooved at longitudinally spaced positions corresponding to the valve casing fluid ports and a plurality of radial, small-diameter holes extend from the peripheral grooves to the inner peripheral surface of the sleeve. The grooves associated with the valve casing load ports preferably employ a plurality of longitudinally spaced circumferential series of radial holes, with large-diameter portions of one of said series extending partly through the sleeve member from the outer peripheral surface inwardly towards the valve spool.

DESCRIPTION OF THE PREFERRED EMBODIMENT

Figure 1:
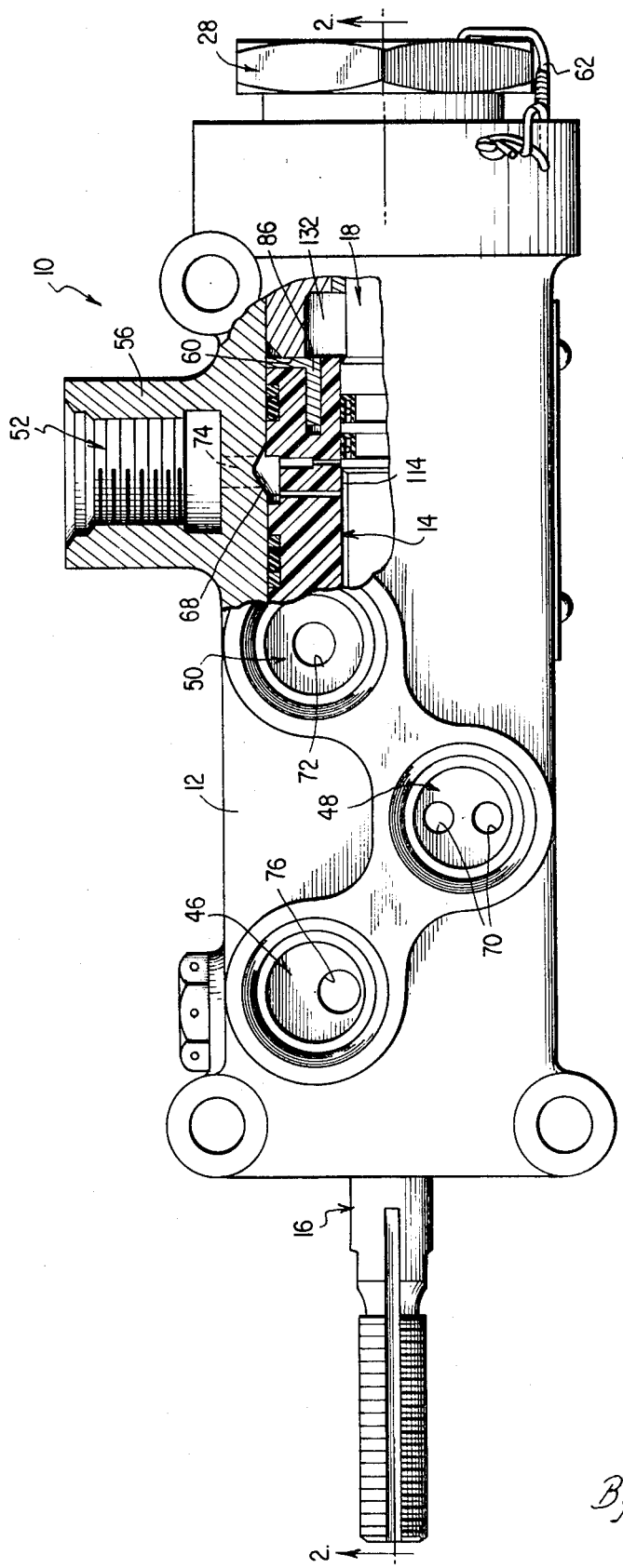
FIG. 1 is a plan view, partially in section, of the improved spool valve of the present invention, with the operating shaft and valve spool at the extreme right-hand position.

Referring to the drawings, the high-pressure spool valve of the present invention for application over a wide range of temperatures from the cryogenic range to that of several hundred degrees Fahrenheit, is indicated generally at 10 and comprises four principal components, a cast metal valve casing 12, a valve casing sleeve assembly 14, an operating shaft 16 and an integral spool 18 which actually forms the right-hand end of the operating shaft 16.

Figure 2:
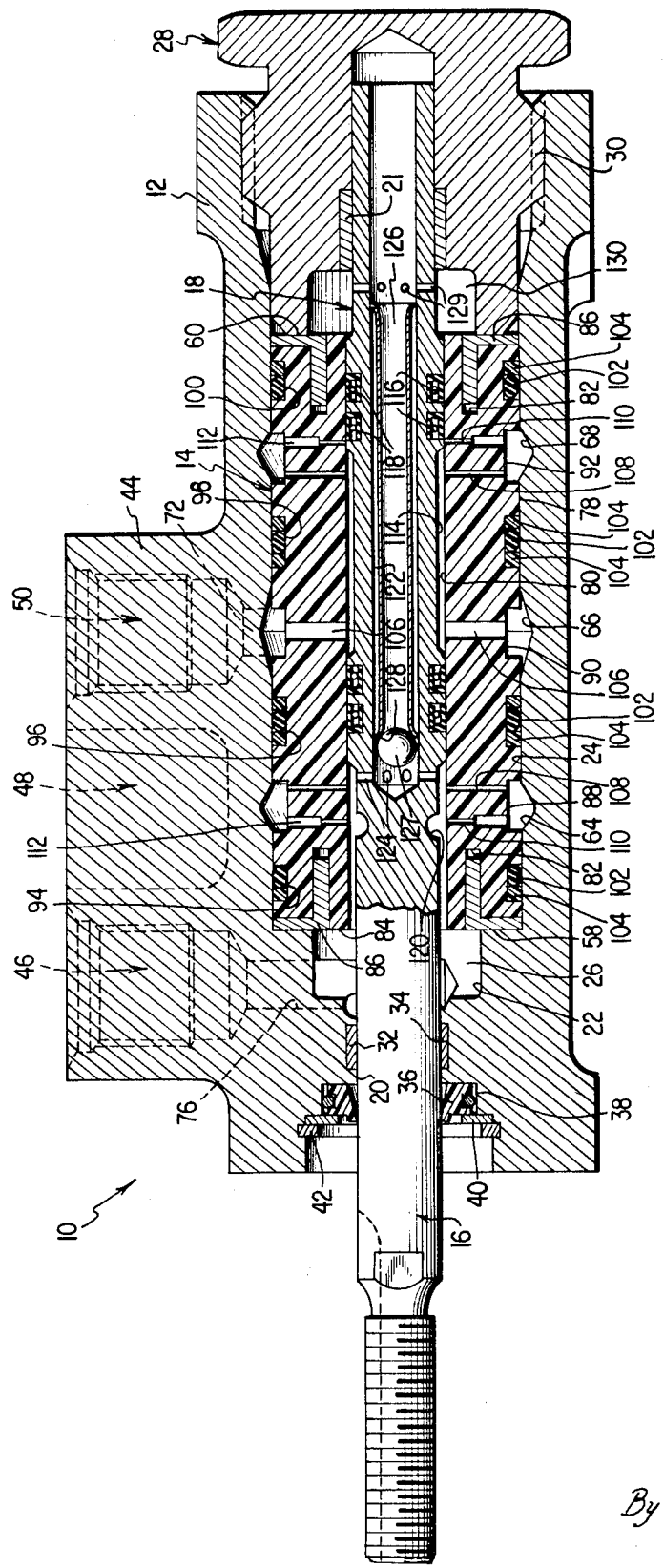
FIG. 2 is a side elevational view, in section, of the valve shown in FIG. 1 taken about lines 2–2.

The cast metal valve casing 12, which may be either rectangular or cylindrical in overall configuration is provided with a bore 20, FIG. 2 on the order of the diameter of shaft 16. Bore 20 receives the shaft for reciprocation within the valve casing fluid cavity 26 which is, in general, defined by counterbores 22 and 24, and a threaded end plug 28 at the right-hand end of the valve casing. In this respect, the valve casing 12 is further counterbored and threaded at 30 to threadably receive end plug 28.

The reciprocating operating shaft 16 is supported within bearing 21 carried by end plug 28. Further, spool 18 is supported by the concentric sleeve assembly 14 which is received primarily within counterbore 24 of the valve casing 12. This valve is designed to operate with a fairly rigid drive shaft connected to shaft 16 for reciprocating spool 18. By adding the bearing in plug end of valve, any type of drive may be used to reciprocate shaft 16 and spool 18. The left-hand end of the operating shaft 16 is mounted for limited reciprocation within bore 20, with the shaft sliding upon Teflon bearing 32 which is positioned within annular recess 34 formed directly within the valve casing bore 20. A wiper ring 36 is maintained in position within annular casing recess 38 by means of washer 40 and split mounting ring 42. The wiper ring has a peripheral edge which is in contact with shaft 16 to prevent excessive wear on the bearing 32 and bore 20. Some leakage of high-pressure fluid exiting from valve cavity 26, along a surface of shaft 16 tends to blow any accumulated dirt from the wiper ring 36. The wiper ring is used as a dust seal preventing any entry of dirt or dust into the valve.

The valve casing 12 is provided with an irregular radially projecting portion 44 which extends from its upper surface, as seen in FIG. 2, and carries respectively from left to right, valve casing exhaust port 46, No. 1 load port 48, as best seen in FIG. 1, and a pressurized working fluid inlet port 50, which is longitudinally in line with exhaust port 46 and laterally spaced from the No. 1 load port. The NO. 1 load port 48 acts either as an inlet or outlet port depending on whether it is delivering high-pressure fluid to the load device or receiving exhaust fluid therefrom for delivery to the common valve casing exhaust port 46. To the right of the inlet port 50, and extending at right angles to the axis of ports 46, 48 and 50, is the No. 2 load port 52. Port 52 is also fluid coupled to the load device (not shown) and acts either as a high-pressure working fluid delivery port to the load device or as an exhaust fluid inlet port to the valve casing from the load, depending upon the position of the valve spool 18. The No. 2 load port 52 is carried within a radially extending portion 56 which, as stated previously, is at right angles to the portion 44 carrying ports 46, 48 and 50. Since the exhaust port 46 is open to the atmosphere and connected at all times to the fluid cavity 26, the internal pressure on wiper ring 36 is only momentary at the time the valve exhausts and this is a function of the pressure drop of the system and the volume of the system connected to ports 48 and 52.

The present invention is directed to the improved sleeve assembly 14 of unitary construction which is carried within that portion of the valve casing 12 formed by counterbore 24 and in a fixed longitudinal position defined by shoulder 58 formed between counterbores 22 and 24, respectively. The sleeve assembly 14 is held in its predetermined position by the threaded end plug whose leading edge 60 abuts the right-hand end of the sleeve assembly 14. ONce the end plug 28 is threadably secured with the sleeve 14 in shoulder-abutting position, the end plug is prevented from working loose by latching the end plug to the valve casing 12 by means of the twisted wire 62, FIG. 1. Bore 24 is provided with longitudinally spaced peripheral grooves or recesses 64, 66, and 68 which are in alignment with the No. 1 load port 48, the pressurized fluid inlet port 50 and the No. 2 load port 52, respectively. Further, a pair of spaced holes 70 fluid couple the No. 1 load port to the annular groove 64 while a single hole 72 couples the inlet port 50 to the annular groove 66. At the extreme right-hand end of the valve, a single hole 74 couples the annular groove 68 to the No. 2 load port 62. The exhaust port 46 is fluid coupled to the cavity 26 by means of the single hole 76. The function of the spool 18, which is an enlarged diameter portion of the reciprocating shaft 16, at the right-hand end thereof, is to selectively couple the inlet port 50 to either the No. 1 load port 48 or the No. 2 load port 52 while allowing the return of fluid from the load device (not shown) to the exhaust port 46 through that load port which is momentarily disconnected from the pressurized working fluid inlet port 50.

The primary member of the sleeve assembly 14 is the unitary sleeve member 78 which has an outer peripheral surface of a diameter corresponding to that of bore 24 and an internal bore 80 whose diameter is closely approximate of that of the spool 18. The unitary sleeve member 56 is formed of a material constituting a nylon-molybdenum disulfide composition manufactured under the trade name "Nylatron GS," a registered trademark of the Polymer Corporation. The nylon-molybdenum disulfide composition sleeve member operates with enhanced efficiency over known sleeve members, since this material has high wear resistance. It further enhances reciprocation of the spool 18, since the internal lubricant, molybdenum disulfide provides greater surface lubricity. Further, the tensile strength is higher than previous nylon components and the elastic modulus is increased over 40 percent. Nylatron GS sleeves resist distortion at temperatures even above 300° F., which makes the valve assembly highly suitable to working fluid or ambient conditions at temperatures within the cryogenic range to as high as 300° F. Further, with thermal expansion less than 65 percent of nylon, the Nylatron GS sleeve maintains a better clearance with respect to the reciprocating spool 18 and has less tendency to freeze.

The particular configuration of the unitary Nylatron GS sleeve 78 further facilitates improved operation of the valve. A pair of annular slots 82 are formed within the end faces 84 of the sleeve 78, which slots receive L-shaped, annular rings 86 formed of stainless steel. These rings act as hardened abutments for both shoulder 58 and the end face 60 of end plug 28 during assembly. This ensures positive positioning regardless of thermal fluctuation of the sleeve within bore 24 of the casing. Further, the outer periphery of the Nylatron GS sleeve member 78 carries on either side of annular recesses or grooves 88, 90 and 92, shallow grooves 94, 96, 98 and 100, respectively. Grooves 94, 96, 98 and 100 each carry, an O-ring 102 formed of rubber, Teflon, nylon or the like and split pressure rings 104 on one side or on both sides thereof, and form fixed peripheral seals between the sleeve member 78 and the casing bore or wall 24. This prevents high-pressure fluid from passing between annular recesses 88, 90 and 92 except through associated radial holes along a path controlled by valve spool 18.

In this respect, a series of large-diameter, circumferentially spaced, radial holes 106 extend from peripheral recess 90 to the bore 80 of the Nylatron GS sleeve member 78. With respect to peripheral recesses 88 and 92, there are provided at least two longitudinally separated series of small diameter, circumferentially spaced, radial holes at 108 and 110, respectively, the holes 110 having enlarged diameter portions 112 which extend radially inward to a limited degree, from the groove 88 toward the sleeve member bore 80.

With this arrangement in mind, the flow of fluid is controlled by the position of the reciprocating operating shaft 16 and its integral spool 18. The periphery of spool 18 is relieved by a circumferential, elongated recess 114 which extends a distance on the order of the longitudinal centerline distance between the inlet port 50 and either the No. 1 load port 48 or the No. 2 load port 52. On each side of the elongated annular recess 114, there are provided two axially spaced rectangular recesses or grooves 116 which receive Teflon seals 118 which are C-shaped in cross section with their open ends facing the elongated peripheral recess 114. A rounded peripheral recess 120 separates the spool from the reduced diameter portion of shaft 16 to the left thereof. The spool 18 is centrally bored at 122 to a point just short of the annular recess 120. Further, a plurality of circumferentially spaced, radial holes 124 extend from the bore 122 to the outer periphery of the spool 18, just behind the circumferential groove 120 and open up onto a reduced diameter spool portion initiated to the left of the spool seals for port 48 as seen in FIG. 2. Further, a hollow tube 126 having flared ends is inserted within bore 122 and acts to maintain a ball 127 in position such that the ball seats within the flared inner end 128 of cylindrical member 126. The flared edges contact the periphery of bore 122 such that when the ball is in the position shown in FIG. 2 fluid communication is prevented between the fluid cavity 130 formed partially by the bore 132 within the inner face of end plug 28. However, exhaust holes 129 fluid couple tube 126 and cavity 130. The purpose of this one-way valve will become apparent from the description of the operation of the improved spool valve of the present invention.

The holes 124 are radial so they will not operate against bore 80. If a one-way valve is not located in the passage formed by tube 126, the exhaust fluid will travel from area 26 to area 130. The sudden surge of pressure in area 130 causes a back pressure to be formed on the spool end, facing area 130, while spool is in movement, this increases force required to move the spool and a momentary hesitation or jerking. When ball 127 is pressurized against tube 126 this prevents a pressure buildup in area 130. The ball check increases the surface area on spool 18 subjected to exhaust pressure from area 26, thereby giving a force assist to power which is reciprocating the spool 18. When the spool is in the opposite position and exhausting fluid from area 130 to area 26 and to exhaust port 46, basically the same condition as above exists. Due to restriction imposed by holes 124 in spool 18 on fluid traveling from area 130 through tube 126, a force area at holes 124 is built up, thereby giving a force assist to power which is reciprocating spool 18.

In operation, it is assumed that the operating shaft 16 is positioned in its right-hand extreme position, as shown in FIGS. 1 and 2. It is further assumed that fluid under high pressure is being supplied to the valve casing inlet port 50 (by means not shown) and that a load device is coupled to the NO. 1 load port 48 and the No. 2 load port 52. Further, an exhaust line (not shown) is assumed as being connected to the valve casing at the valve casing exhaust port 46. With high-pressure fluid being delivered to inlet port 50 and with the spool 18 of the operating shaft in the position shown in FIG. 2, high-pressure fluid passes through the hole 72, into the annular recess formed by the grooves 66 of the valve casing, and 90 of the sleeve assembly 14, and by means of the series of circumferentially spaced holes 106, into the elongated peripheral recess 114 of the valve spool 18. It then passes from left to right and through the series of small-diameter radial holes 108 to the annular recess formed by grooves 92 and 68 and from there it passes by means of hole 74 to the No. 2 load port 52. High-pressure fluid is thus delivered to an associated load device (not shown). Simultaneously, the NO. 1 load port 48 is fluid coupled through multiple holes 70, the annular passage formed by grooves 88 and 64 and the circumferentially spaced series of radial, small-diameter holes 110, annular recess 120 of the operating shaft 60, the passage between the smaller diameter portion of shaft 16 and the bore 80 of the Nylatron GS sleeve member 78 to the left-hand end of the valve casing cavity 26 and the single hole 76 to the exhaust port 46. Assuming that the load device constitutes a servosystem including a fluid motor power piston, high-pressure fluid delivered to one side of the power piston moves the same relative to its casing and causes fluid on the opposite side to be exhausted from the motor which is returned to the exhaust side of the fluid control system via the No. 1 load port 48 and exhaust port 46 to the exhaust line (not shown).

Figure 3:
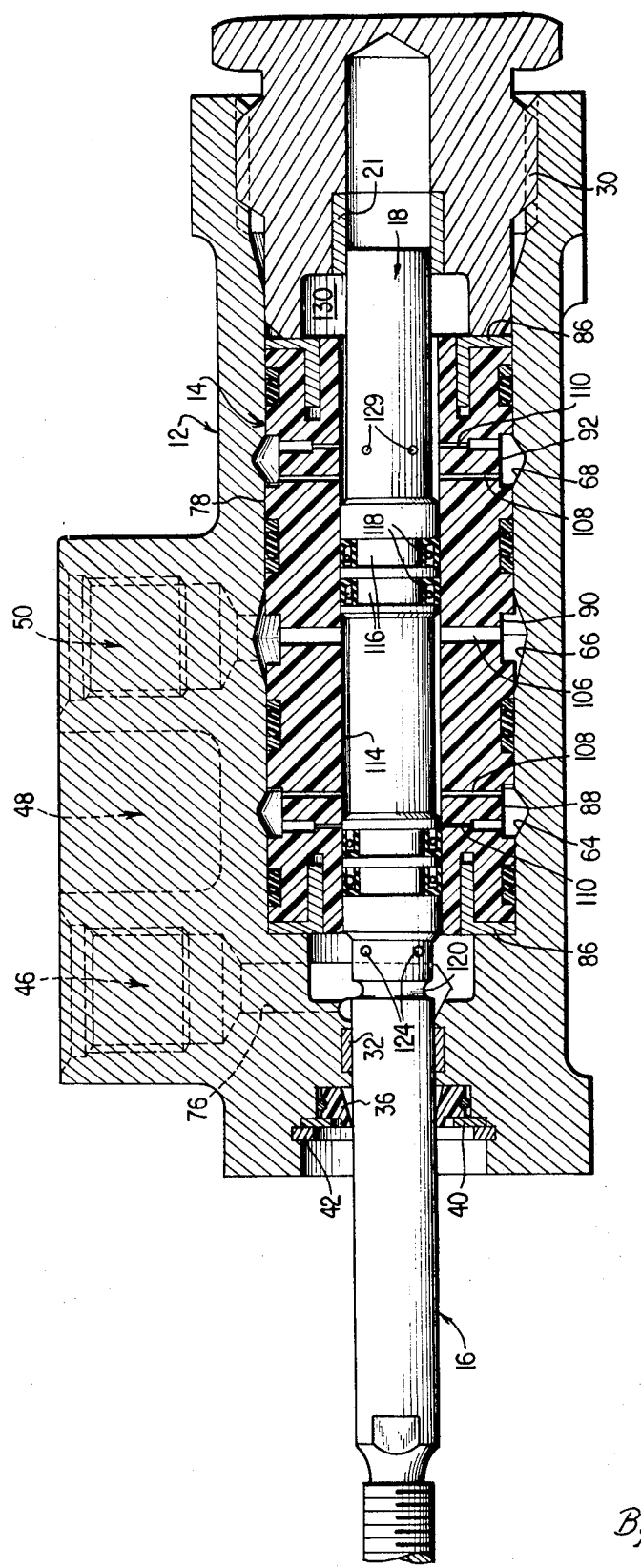
FIG. 3 is a sectional, side elevational view similar to that of FIG. 2, with the operating shaft and valve spool in its extreme left-hand position.

Under conventional operation, means (not shown) shifts the operating shaft 16 from the extreme right-hand position shown in FIG. 2 to the extreme left-hand position shown in FIG. 3. This causes the elongated peripheral recess 114 of spool 18 to be in such a position that it acts to fluid couple the pressurized inlet port 50 to the No. 1 load port 48. High-pressure fluid, entering hole 72 and the recess formed by peripheral grooves 66 and 90 moves through the series of circumferentially spaced radial holes 106 to the smaller diameter series of radial holes 108 within the unitary Nylatron GS sleeve member 78. The fluid then passes, by means of an annular passage formed by opposed annular grooves 64 and 88, to the No. 1 load port via paired openings or holes 70. At the same time, the pressurized inlet port 50 is cut off from the No. 2 load port 52. However, it is noted that fluid which is exhausted from the load device (not shown), in entering the No. 2 load port 52 will readily pass into the annular space formed by opposed peripheral grooves 68 and 92 and by means of both series of circumferentially spaced, relatively small diameter radial holes 108 and 110, enters the right-hand fluid cavity 130. Since the spool 18 is bored, fluid will pass via tube 126 toward the ball member 127. Since this return exhaust fluid is under some pressure, it will displace the ball 127 from the right-hand position shown in FIG. 2, causing it to move off the valve seat formed by the flared end 128 of tube 126 and thereby allow the exhaust fluid to pass through the radial holes 124 and enter left-hand valve casing cavity 26 where the fluid readily exhausts through hole 76 to the left-hand exhaust port 46. It will be noted that the two sets of axially spaced radial holes 108 and 110 permit adjustment to be made in the flow rate, if required, by controlling axial travel of the spool 18, while the large-diameter portion 112 of holes 110 allows greater flow than the small-diameter holes alone.

While the valve assembly carries a single exhaust port, a single pressurized fluid inlet port, a pair of load ports in longitudinally spaced fashion, and a single outer peripheral recess in the valve spool to fluid couple the inlet port to the individual load ports, it is obvious that the valve spool 18 may employ a number of longitudinally spaced, peripherally relieved portions and the valve casing itself may employ a larger number of axially spaced ports for selective fluid coupling to mulitple load devices, for instance. Further, while the sleeve assembly is formed principally of a single element Nylatron GS cylinder, it is apparent that the assembly may incorporate a series of cylindrical segments of a nylon-molybdenum disulfide composition material positioned in axially abutting fashion with the bore surfaces thereof in periphral contact with the reciprocating spool 18.

I claim:

1. In a spool valve including a valve casing having means defining a longitudinally extending internal fluid cavity, a plurality of longitudinally spaced fluid ports carried by said casing and opening up into said cavity with two of said ports being load ports longitudinally spaced on respective opposite sides of a pressure port, a cylindrical spool coaxially positioned within said casing cavity for reciprocating movement along said casing axis, the improvement comprising: a sleeve assembly fixedly positioned within said casing and concentrically positioned between said spool and said casing internal wall with said sleeve assembly having at least a spool contact surface formed of a nylon-molybdenum disulfide composition, a unitary sleeve member formed entirely of nylon-molybdenum disulfide composition having a plurality of longitudinally spaced circumferential grooves in the outer periphery of said sleeve member each communicating with a respective one of said longitudinally spaced fluid pressure and load ports, said sleeve member having a series of circumferentially spaced, radial holes for said pressure port and a plurality of longitudinally spaced series of circumferentially spaced radial holes for each load port with each radial hole extending inwardly from the respective groove to the spool contact surface of said sleeve member, the radial holes communicating with each load port groove each being of relatively small diameter with the longitudinally outwardly spaced series of holes for each load port having an enlarged coaxial diameter portion communicating between the respective load port groove and the small diameter portion extending inwardly to said spool contact surface whereby increased flow is adapted to be provided by said enlarged diameter portion, and a pair of longitudinally spaced peripheral seals carried by said spool for each load port with said seals adapted to be positioned longitudinally outwardly of either respective series of small diameter radial holes of the respective load port in response to said spool being positioned to connect the pressure port with the respective load port for controlling the flow rate through said load port accordingly.

2. In a spool valve including a valve casing having means defining a longitudinally extending internal fluid cavity, a plurality of longitudinally spaced fluid ports carried by said casing and opening up into said cavity, a cylindrical spool coaxially positioned within said casing cavity for reciprocating movement along said casing axis, the improvement comprising: a unitary sleeve assembly formed entirely of nylon-molybdenum disulfide fixedly positioned within said casing and concentrically positioned between said spool and said casing internal wall with said sleeve assembly having at least a spool contact surface formed of a nylon-molybdenum disulfide composition, said sleeve member having annular slots formed within the ends of said sleeve member, and annular metal rings received by said slots and at least flush with the ends of said sleeve member to facilitate the fixed positioning of said sleeve member within said casing cavity.

3. The spool valve as claimed in claim 2 wherein; said annular metal rings are formed of stainless steel and L-shaped in cross section and having radial flanges which extend radially outwardly from said annular slots toward said casing side walls.

4. In a spool valve including a valve casing having means defining a longitudinally extending internal fluid cavity, a plurality of longitudinally spaced fluid ports carried by said casing and opening up into said cavity, a cylindrical spool coaxially positioned within said casing cavity for reciprocating movement along said casing axis to opposite limit positions, the improvement comprising: a sleeve assembly fixedly positioned within said casing and concentrically positioned between said spool and said casing internal wall with said sleeve assembly having at least a spool contact surface formed of nylon-molybdenum disulfide composition, means on said casing defining a central fluid pressure inlet port and a pair of pressurized fluid load ports each longitudinally spaced on a respective opposite side of said inlet port, means defining a fluid pressure exhaust port in said casing longitudinally spaced adjacent one of said load ports, means carried by said spool for alternately connecting and disconnecting the central fluid pressure inlet port with a respective one of said pressurized fluid load ports and alternately connecting said exhaust port with said one load port in response to said spool being reciprocated to a respective one of said opposite limit positions, said cylindrical spool having a central bore in continuous connection with said exhaust port and alternately connected with the other load port in response to said spool being reciprocated to a limit position in which said other load port is disconnected from said inlet port, and means in said bore automatically operated in response to the movement of said spool from each limit position for applying fluid pressure from the load port disconnected from said inlet port to assist the movement of said spool in a respective direction for further disconnecting said disconnected load port from said inlet port.

5. The spool valve as claimed in claim 4 wherein said bore in said spool has at least one radially projecting, small-diameter hole for each load port extending from said spool bore to the outer surface thereof adapted to communicate fluid pressure from the respective load port to said bore after disconnection of said load port from said inlet pressure port, and said automatically operated means comprises a tube of slightly smaller diameter than said spool valve bore, having a flared end and fixedly positioned with said bore, and a ball valve of lesser diameter than said bore but of a larger diameter than the internal diameter of said tube positioned within said spool bore, between said tube flared end and one said spool radial hole for engagement alternately with said flared end and one radial hole in response to fluid pressure applied respectively through said one radial hole and tube.